United States Patent
Smadi et al.

(10) Patent No.: US 9,674,884 B2
(45) Date of Patent: Jun. 6, 2017

(54) ACTIVATING A MOBILE HOTSPOT OPERATION

(71) Applicant: BlackBerry Limited, Waterloo (CA)

(72) Inventors: Mohammed Nawaf Smadi, Ancaster (CA); Mohamed Darwish A. Mohamed, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 14/722,882

(22) Filed: May 27, 2015

(65) Prior Publication Data
US 2016/0353495 A1 Dec. 1, 2016

(51) Int. Cl.
*H04W 48/14* (2009.01)
*H04W 76/02* (2009.01)
*H04W 36/00* (2009.01)
*H04W 48/02* (2009.01)
*H04W 88/04* (2009.01)
*H04W 88/06* (2009.01)

(52) U.S. Cl.
CPC ......... *H04W 76/023* (2013.01); *H04W 36/00* (2013.01); *H04W 48/02* (2013.01); *H04W 48/14* (2013.01); *H04W 76/02* (2013.01); *H04W 88/04* (2013.01); *H04W 88/06* (2013.01)

(58) Field of Classification Search
CPC ..... H04W 72/04; H04W 76/02; H04W 16/10; H04W 28/16; H04W 16/14; H04W 76/023; H04W 36/00; H04W 48/02; H04W 88/04; H04W 88/06; H04W 48/14
See application file for complete search history.

(56) References Cited

U.S. PATENT DOCUMENTS

| 2011/0028085 | A1 | 2/2011 | Waung | |
|---|---|---|---|---|
| 2013/0182693 | A1* | 7/2013 | Sperling | H04W 12/06 370/338 |
| 2014/0075011 | A1* | 3/2014 | Salkintzis | H04W 76/028 709/224 |
| 2015/0103708 | A1 | 4/2015 | Kang | |

FOREIGN PATENT DOCUMENTS

EP 2552134 1/2013

OTHER PUBLICATIONS

Tom Pica; "Smartphone Mobile Hotspot—Wireless Workshop: Turning Your Smartphone into a Mobile Hotspot"; Dec. 13, 2012; 2 pages; <http://www.verizonwireless.com/news/article/2012/12/wireless-workshops-smartphone-mobile-hotspot.html>.
Extended European Search Report issued in European Application No. 16169682.8 on Sep. 28, 2016.

* cited by examiner

*Primary Examiner* — Ted Wang
(74) *Attorney, Agent, or Firm* — Fish & Richardson P.C.

(57) ABSTRACT

A method for activating a mobile hotspot operation includes detecting, at a mobile device, an event associated with activating a mobile hotspot operation on the mobile device. In response to the detection of the event, a mobile hotspot operation is activated on the mobile device. A connection request to access the mobile device as a mobile hotspot is received from an additional device. In response to the connection request, the access to the additional device is granted.

15 Claims, 2 Drawing Sheets

ACTIVATING A MOBILE HOTSPOT OPERATION

TECHNICAL FIELD

This disclosure relates to data transmission in communication systems and, more specifically, to activating a mobile hotspot operation.

BACKGROUND

In a mobile hotspot (MHS) operation, a mobile device may connect to the Internet using cellular technologies and provide Internet connections to other devices over a Wi-Fi connection. Examples of other devices may include a laptop, a tablet, and any other electronic devices that support the Wi-Fi access technology.

DESCRIPTION OF DRAWINGS

Like reference numbers and designations in the various drawings indicate like elements.

DETAILED DESCRIPTION

The present disclosure is directed to activating a mobile hotspot operation. In a mobile hotspot (MHS) operation, a mobile device may connect to the Internet using cellular technologies and provide Internet connections to other devices over a Wi-Fi connection. Examples of other devices may include a laptop, a tablet, and any other electronic devices that support the Wi-Fi access technology. In some cases, the mobile device may provide the mobile hotspot service to other devices using an infrastructure mobile. Alternatively or in combination, the mobile device may provide the mobile hotspot service using Point to Point (P2P) protocols, e.g., Wi-Fi direct.

In some cases, the MHS operation may be activated by an explicit action of a user. In one example, the user may manually turn on an MHS operation by accessing a user interface, e.g., by clicking a button or an icon, on the mobile device. However, this approach may be cumbersome for a user because each time the user wants to use MHS, the user has to manually access the mobile device. In addition, in some cases, the user may need to also configure the devices that may be authorized to access the MHS. These operations further reduce the user experience of the MHS.

In another example, the user may set the MHS operation to be always on by accessing a configuration profile of the mobile device. This approach may reduce the user interactions that are needed to turn on the MHS, but it may negatively impact the battery life of the mobile device. An MHS operation may consume a significant amount of power, and therefore, configuring the mobile device to turn on MHS all the time may quickly drain the battery power of the mobile device.

Figure 1:
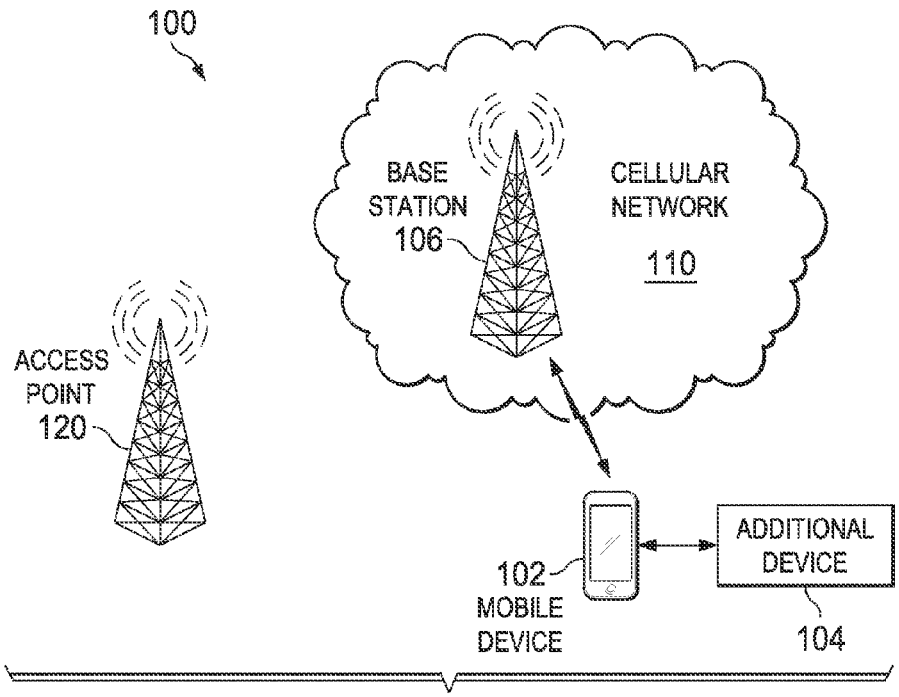
FIG. 1 is an example wireless communication system that activates a mobile hotspot operation.

FIG. 1 is an example wireless communication system 100 that activates a mobile hotspot operation. For example, in a wireless communication system, an event associated with activating a mobile hotspot operation on a mobile device may be detected at the mobile device. In some cases, an association of the event and an activation of a mobile hotspot operation may be determined. The association may be determined based on a prior manual activation of a mobile hotspot operation and a prior occurrence of the event. In some cases, the event may include a detection by the mobile device of a Wi-Fi access point having a service set identification (SSID). In some cases, the event may include a loss of a connection between the mobile device and a Wi-Fi access point.

In response to the detection of the event, a mobile hotspot operation may be activated on the mobile device. In some cases, the mobile hotspot operation may be activated further in response to at least one of a time of the occurrence of the event or a location of the occurrence of the event.

A connection request to access the mobile device as a mobile hotspot may be received from an additional device. In response to the connection request, the access to the additional device may be granted. In some cases, the access may be granted in response to a determination that the additional device has previously accessed the mobile device as a mobile hotspot. In some cases, the access may be granted in response to a determination that the additional device has communicated with the same Wi-Fi access point as the mobile device before the occurrence of the event.

Activating a mobile hotspot operation according to methods and systems described herein may provide one or more advantages. For example, this approach may enable the mobile device to learn the use patterns of hotspot activations and provide an automatic operation with no or reduced user input. Furthermore, this approach may enable the mobile device to automatically grant access to qualified additional devices and, therefore, improve security of a mobile hotspot operation.

At a high level, the example wireless communication system 100 includes a cellular network 110, which includes a base station 106 that is configured to communicate with a mobile device 102. The example wireless communication system 100 also includes an access point 120 and an additional device 104 that is communicatively coupled to the mobile device 102.

Figure 2:
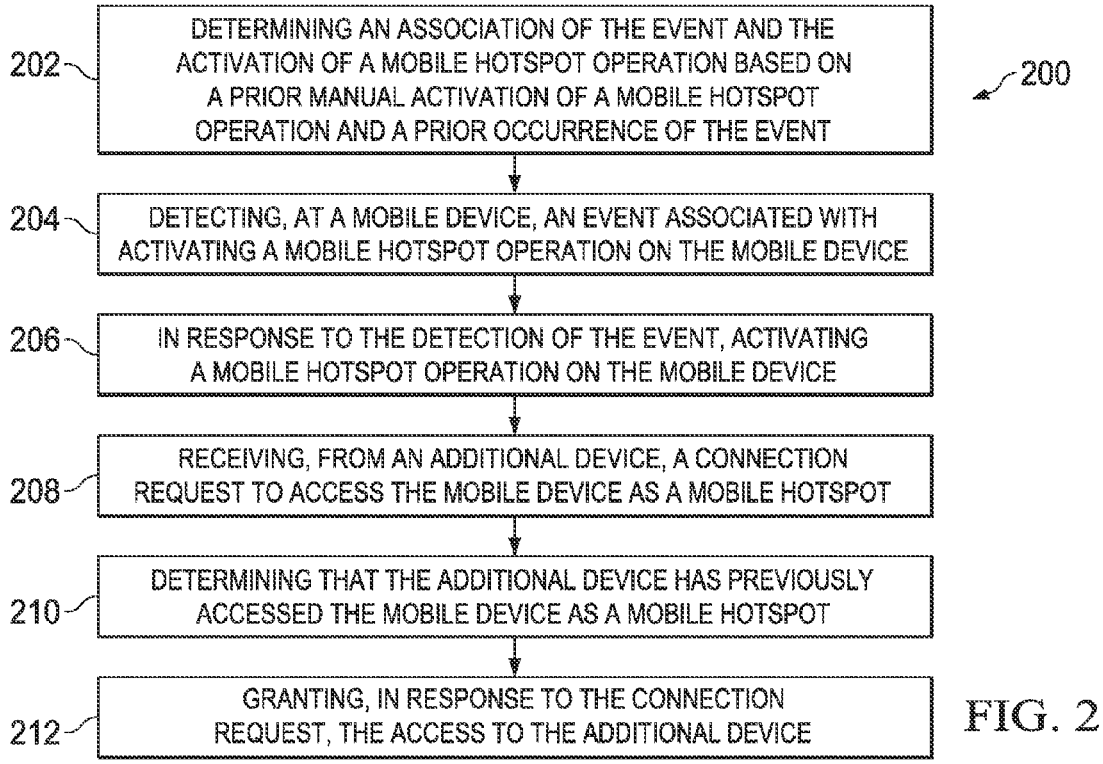
FIG. 2 is a flowchart illustrating an example method for activating a mobile hotspot operation.
Figure 3:
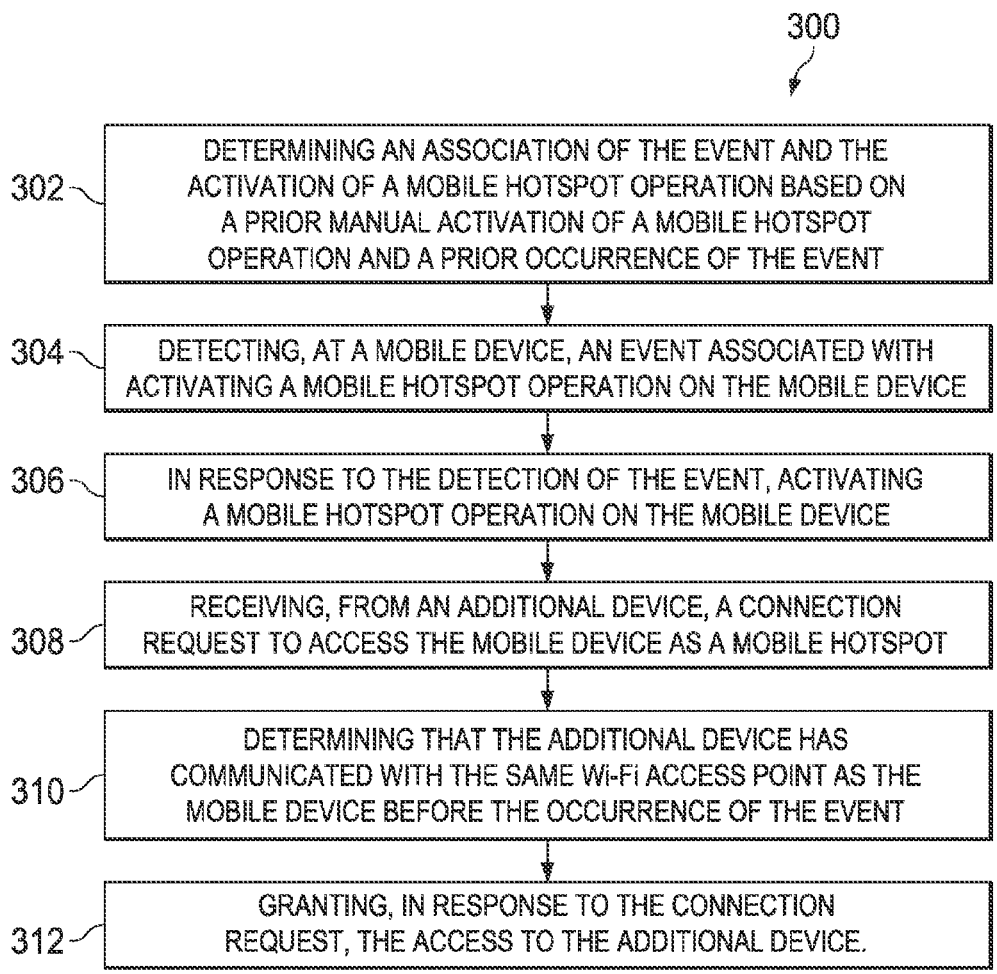
FIG. 3 is a flowchart illustrating another example method for activating a mobile hotspot operation.
Figure 4:
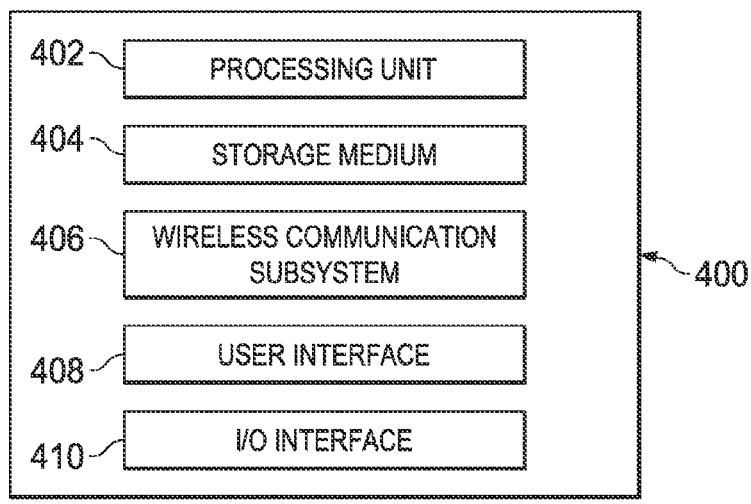
FIG. 4 is a block diagram illustrating an example mobile device.

In operation, the mobile device 102 determines an event associated with activating a mobile hotspot operation. In some cases, an association of the event and an activation of a mobile hotspot operation may be determined. In some cases, the event may include a detection by the mobile device 102 of the access point 120 having a service set identification (SSID). In some cases, the event may include a loss of a connection between the mobile device and the access point 120. In response to the detection of the event, the mobile device 102 activates a mobile hotspot operation. FIGS. 2-4 and associated descriptions provide additional details of both UL and DL transmissions.

The mobile device 102 receives a connection request to access the mobile device 102 as a mobile hotspot from the additional device 104. In response to the connection request, the mobile device 102 grants the access to the additional device 104. In some cases, the access may be granted in response to a determination that the additional device 104 has previously accessed the mobile device 102 as a mobile hotspot. In some cases, the access may be granted in response to a determination that the additional device 104 has communicated with the access point 120 before the occurrence of the event. FIGS. 2-4 and associated descriptions provide additional details of both UL and DL transmissions.

Turning to a general description of the elements, a mobile device may be referred to as user equipment, mobile electronic device, user device, mobile station, subscriber station, portable electronic device, mobile communications device, wireless modem, or wireless terminal. Examples of a mobile device (e.g., the mobile device 102) may include a cellular phone, personal data assistant (PDA), smart phone, laptop, tablet personal computer (PC), pager, portable computer, portable gaming device, wearable electronic device, or other mobile communications device having components for communicating voice or data via a cellular network. The cellular network may include a wireless link over at least one of a licensed spectrum and an unlicensed spectrum.

Other examples of a mobile device include a mobile and fixed electronic device. A mobile device may include a Mobile Equipment (ME) device and a removable memory module, such as a Universal Integrated Circuit Card (UICC) that includes a Subscriber Identity Module (SIM) application, a Universal Subscriber Identity Module (USIM) application, or a Removable User Identity Module (R-UIM) application. The term "mobile device" can also refer to any hardware or software component that can terminate a communication session for a user. In addition, the terms "user equipment," "UE," "user equipment device," "user agent," "UA," "user device," and "mobile device" can be used synonymously herein.

The cellular network 110 may include one or a plurality of radio access networks (RANs), core networks (CNs), and external networks. The RANs may comprise one or more radio access technologies. In some implementations, the radio access technologies may be Global System for Mobile communication (GSM), Interim Standard 95 (IS-95), Universal Mobile Telecommunications System (UMTS), CDMA2000 (Code Division Multiple Access), Evolved Universal Mobile Telecommunications System (UMTS), Long Term Evaluation (LTE), or LTE-Advanced. In some instances, the core networks may be evolved packet cores (EPCs).

A RAN is part of a wireless telecommunication system which implements a radio access technology, such as UMTS, CDMA2000, 3GPP LTE, and 3GPP LTE-A. In many applications, a RAN includes at least one base station 106. A base station 106 may be a radio base station that may control all or at least some radio-related functions in a fixed part of the system. The base station 106 may provide radio interface within their coverage area or a cell for the mobile device 102 to communicate. The base station 106 may be distributed throughout the cellular network to provide a wide area of coverage. The base station 106 directly communicates to one or a plurality of mobile devices, other base stations, and one or more core network nodes.

While described in terms of FIG. 1, the present disclosure is not limited to such an environment. The base station 106 may operate on any of the different wireless communication technologies. Example wireless technologies include Global System for Mobile Communication (GSM), Universal Mobile Telecommunications System (UMTS), 3GPP Long Term Evolution (LTE), LTE-Advanced (LTE-A), wireless broadband communication technologies, and others.

The access point 120 may include any device that enables a device to connect to a wireless location area network (WLAN). In some cases, the access point 120 can operate on a wireless broadband technology. Example wireless broadband technologies include IEEE 802.11 wireless local area network, which may also be referred to as Wi-Fi network.

The additional device 104 may include any device that is configured to request access to the mobile device 102 in a mobile hotspot operation. Examples of the devices (e.g., the additional device 104) may include a cellular phone, personal data assistant (PDA), smart phone, laptop, tablet personal computer (PC), pager, portable computer, portable gaming device, wearable electronic device, or other communications device having components for communicating voice or data with a mobile hotspot.

While elements of FIG. 1 are shown as including various component parts, portions, or modules that implement the various features and functionality, nevertheless these elements may instead include a number of sub-modules, third-party services, components, libraries, and such, as appropriate. Furthermore, the features and functionality of various components can be combined into fewer components as appropriate.

FIG. 2 is a flowchart illustrating an example method 200 for activating a mobile hotspot operation. The method 200 may begin at block 202, where an association of an event and an activation of a mobile hotspot operation is determined. In some cases, the association may be determined based on a prior manual activation of a mobile hotspot operation and a prior occurrence of the event.

In some cases, the event may include a detection by the mobile device of a Wi-Fi access point having a service set identification (SSID). In one example, a user Joe attends his son's soccer practice. The soccer arena may provide Wi-Fi access through a Wi-Fi access point. The Wi-Fi access point may have a particular SSID. Joe's mobile device may detect the Wi-Fi access point with the particular SSID in the soccer area. However, the Wi-Fi connectivity may be poor, inaccessible, or require additional charges. Therefore, instead of using the Wi-Fi access point for Internet connection, Joe may turn on the mobile hotspot feature on his mobile device and use his mobile device as a mobile hotspot. Joe can connect additional devices, e.g., a laptop, with the mobile hotspot for Internet connection.

In some cases, the association of detecting the SSID of the Wi-Fi access point at the soccer arena and the manual activation of the mobile hotspot operation may be repeated over time. The mobile device may store the SSID of the Wi-Fi access point that is associated with the manual mobile hotspot activation. The mobile device may also store the number of the repeated occurrences of this association. In some cases, the number of the repeated occurrences may exceed a predetermined number over a predetermined period, and the mobile device may determine that a mobile hotspot operation may be activated whenever the stored SSID is detected. In some cases, the predetermined number and the predetermined period may be set by the user. For example, Joe may set the predetermined number to be 10 times and the predetermined period to be 1 month. Alternatively or in combination, the predetermined number and the predetermined period may be configured by a mobile device manufacturer or a cellular network operator. In another example, the event may include detecting a Bluetooth beacon.

At block 204, an event associated with activating a mobile hotspot operation on the mobile device is detected. For example, the next time Joe goes to the soccer arena, the mobile device detects the SSID of the Wi-Fi access point at the soccer arena. The mobile device determines that the SSID matches the stored SSID.

At block 206, in response to the detection of the event, the mobile device activates the mobile hotspot operation. In some cases, the mobile hotspot operation is turned on for X minutes. In some implementation, X is set to a predetermined duration. For example, X may be set to a default value of 10 minutes. X may also be set or modified by the user. In some cases, X can be determined based on the statistics of previous mobile hotspot operations that trigger the activations. For example, in previous occasions, Joe would turn on the mobile hotspot operation for around 1 hour, which may be the length of the practice time. The mobile devices may store these time durations and set X to the average of the stored durations. The mobile device may continue to adjust X based on subsequent mobile hotspot operations.

In some cases, the associations may be refined based on additional use pattern information. In one example, the association may further include a time of the event. In these or other examples, the mobile device may detect that Joe routinely activates the mobile hotspot operation when the stored SSID is detected at 4:30 pm on Friday, which is the time of soccer practice. The mobile device may activate the mobile hotspot operation if the stored SSID is detected at the same time. On the other hand, the mobile device may not activate the mobile hotspot operation if the stored SSID is detected at a different time. In another example, the association may further include a location of the event. In these or other examples, the mobile device may determine the current location when the mobile hotspot operation is activated. In some cases, the mobile device may use Global Positioning System (GPS) to determine the location. Therefore, the mobile device may activate the mobile hotspot operation if the stored SSID is detected at the same location. On other hand, the mobile device may not activate the mobile hotspot operation if the stored SSID is detected at a different location.

At block 208, a connection request to access the mobile device as a mobile hotspot is received from an additional device. For example, Joe may turn on his laptop, which requests to connect to the mobile device for Internet connection. In some cases, the mobile device may determine whether to grant access to the additional device using Media Access Control (MAC) filtering. In these or other cases, the mobile device may maintain a list of authorized MAC addresses for which access can be granted. In some cases, the MAC address of the additional device may be included in the connection request. The mobile device may check the MAC address of the additional device and grant the access if the MAC address is one of the authorized MAC addresses.

In some cases, the authorized MAC addresses may be configured by the user. For example, Joe may enter the MAC address of his laptop into the list of authorized MAC addresses. In some cases, the authorized MAC addresses may be configured automatically based on the use pattern of the mobile hotspot operations. For example, the mobile device may store the MAC addresses of devices that have been previously granted access to the mobile device in mobile hotspot operations. Therefore, if the additional device has been granted access to the mobile device before, the mobile device may grant the access. Otherwise, the mobile device may deny the access. For example, at block 210, the mobile device determines that the additional device has previously accessed the mobile device as a mobile hotspot. Therefore, at block 212, the access is granted.

In some cases, the list is further refined by the context of the access. For example, the mobile device may grant the access to the additional device if the additional device has connected to the mobile device when the event was previously triggered. As discussed previously, additional context information, e.g., a location of the event or a time of the event, may also be associated with each authorized MAC address.

In some cases, if the MAC address of the additional device is not included in the list of authorized MAC addresses, the mobile device may present a visual indication to the user. For example, a pop-up message may appear on the screen of the mobile device to indicate that a new device is attempting to connect. The user may grant or deny the access through the user interface of the mobile device, e.g., by clicking a button or an icon.

FIG. 3 is a flowchart illustrating another example method 300 for activating a mobile hotspot operation. The method 300 may begin at block 302, where an association of an event and an activation of a mobile hotspot operation is determined. As discussed previously, the association may be determined based on a prior manual activation of a mobile hotspot operation and a prior occurrence of the event.

In some cases, the event may include a loss of a connection between the mobile device and a Wi-Fi access point. In one example, a user Joe works in his garage. He may have a mobile device and a tablet. Joe may use the mobile device to download music over the Internet and may use the tablet to watch a video over the Internet. Both the mobile device and the tablet are connected to a Wi-Fi access point for Internet connection. The garage may be at the edge of Joe's home and, therefore, the Wi-Fi coverage may be intermittent. In some cases, Joe's mobile device may detect a loss of the connection to the Wi-Fi access point at home and connect to a cellular network instead. In these or other cases, the tablet may not have access to the cellular network and may continue to experience a poor connection over the Wi-Fi network. Therefore, Joe may turn on the mobile hotspot operation on the mobile device and grant access to the tablet.

In some cases, the association of detecting a loss of the Wi-Fi access point and the manual activation of the mobile hotspot operation may be repeated over time. As discussed previously, the mobile device may store the number of the repeated occurrences of this association. In some cases, the mobile device may determine that the association is established when the number of the repeated occurrences exceeds a predetermined number over a predetermined period. In some cases, the predetermined number and the predetermined period may be set by the user or configured by a mobile device manufacturer or a cellular network operator.

At block 304, an event associated with activating a mobile hotspot operation on the mobile device is detected. For example, the mobile device may detect that the connection to a Wi-Fi access point is lost. At block 306, in response to the detection of the event, the mobile device activates the mobile hotspot operation. As discussed previously, the duration of the mobile hotspot operation may be preconfigured or learned through use patterns of the previous mobile hotspot operations.

In some cases, the associations may be refined based on additional use pattern information. For example, as discussed previously, the association may further include a time of the event or a location of the event. In some cases, the associations may be refined based on the SSID of the Wi-Fi access point to which the connection is lost. For example, the mobile device may store the SSID of the Wi-Fi access point when the Wi-Fi connection is lost and the mobile hotspot operation is turned on. Therefore, if a Wi-Fi connection is lost, the mobile device determines whether the SSID of the Wi-Fi connection matches the stored SSID. The mobile device may turn on the mobile hotspot operation if the SSID of the Wi-Fi connection matches the stored SSID, and may not turn on the mobile hotspot operation if the SSID of the Wi-Fi connection does not match the stored SSID.

At block 308, a connection request to access the mobile device as a mobile hotspot is received from an additional device. In some cases, as discussed previously, the mobile device may determine whether to grant access to the additional device based on a list of the authorized MAC addresses. The authorized MAC addresses may be configured by the user or based on the use pattern of the mobile hotspot operations.

Alternatively or in combination, the mobile device may determine whether the additional device has communicated with the same Wi-Fi access point as the mobile device before the occurrence of the event. For example, when the mobile device was connected to the Wi-Fi access point, the mobile device may listen to the data packets from other devices that transmit to the same Wi-Fi access point and store the MAC addresses of these devices. When the mobile device loses the Wi-Fi connection and turns on the mobile hotspot operation, the mobile device may grant access to the devices that were previously connected to the same Wi-Fi access point. For example, at block 310, the mobile device determines that the additional device has communicated with the same Wi-Fi access point as the mobile device before the occurrence of the event. Therefore, at block 312, the access is granted.

In some cases, the determination of whether to grant access can be further based on the proximity of additional devices relative to the mobile device. In some cases, the proximity can be determined based on the measured receiver power. For example, the mobile device can determine the received signal strength indication (RSSI) of the additional device when the additional device is transmitting to the Wi-Fi access point. The mobile device can determine how close the additional device is by comparing the RSSI with a predetermined threshold. If the RSSI is above the predetermined threshold, the mobile device may determine that the additional device is close to the mobile device and, therefore, grant access to the additional device once the mobile hotspot operation is turned on. If the RSSI is below the predetermined threshold, the mobile device may determine that the additional device is not close to the mobile device and, therefore, will not grant access to the additional device.

FIG. 4 is a block diagram illustrating an example mobile device 400. The illustrated device 400 includes a processing unit 402, a computer-readable storage medium 404 (for example, ROM or flash memory), a wireless communication subsystem 406, a user interface 408, and an I/O interface 410.

The processing unit 402 can include one or more processing components (alternatively referred to as "processors" or "central processing units" (CPUs)) configured to execute instructions related to one or more of the processes, steps, or actions described herein in connection with one or more of the implementations disclosed herein. In some implementations, the processing unit 402 may be configured to generate control information, such as a measurement report, or respond to received information, such as control information from a network node. The processing unit 402 may also be configured to make a Radio Resource Management (RRM) decision such as cell selection/reselection information or trigger a measurement report. The processing unit 402 can also include other auxiliary components, such as random access memory (RAM) and read-only memory (ROM). The computer-readable storage medium 404 can store an operating system (OS) of the device 400 and various other computer-executable instructions, logic or software programs for performing one or more of the processes, steps, or actions described above.

The wireless communication subsystem 406 may be configured to provide wireless communication for voice, data, and/or control information provided by the processing unit 402. The wireless communication subsystem 406 can include, for example, one or more antennas, a receiver, a transmitter, a local oscillator, a mixer, and a digital signal processing (DSP) unit. In some implementations, the subsystem 406 can support multiple-input multiple-output (MIMO) transmissions. In some implementations, the receiver in the wireless communication subsystems 406 can be an advance receiver or a baseline receiver. Two receivers can be implemented with identical, similar, or different receiver processing algorithms.

The user interface 408 can include, for example, one or more of a screen or touch screen (for example, a liquid crystal display (LCD), a light emitting display (LED), an organic light emitting display (OLED), or a micro-electro-mechanical system (MEMS) display), a keyboard or keypad, a trackball, a speaker, and a microphone. The I/O interface 410 can include, for example, a universal serial bus (USB) interface. Various other components can also be included in the device 400. A number of embodiments of the invention have been described. Nevertheless, it will be understood that various modifications may be made. Accordingly, other embodiments are within the scope of the following claims.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation descried above should not be understood as requiring such separation in all implementations, and it should be understood that the described program components and systems can generally be integrated together in a signal software product or packaged into multiple software products.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps are not implied by the order they appear in the claims.

What is claimed is:

1. A method, comprising:
   detecting, at a mobile device, a Wi-Fi access point having a service set identification (SSID);
   determining that the detection of the Wi-Fi access point is associated with activating a mobile hotspot operation on the mobile device based at least in part on the SSID of the Wi-Fi access point, wherein determining based at least in part on the SSID of the Wi-Fi access point comprises determining that the SSID of the Wi-Fi access point is associated with Wi-Fi connectivity between the mobile device and the Wi-Fi access point determined to be lost or intermittent for or inaccessible to the mobile device;

in response to the determining, activating a mobile hotspot operation on the mobile device;

receiving, from an additional device different than the Wi-Fi access point, a connection request to access the mobile device as a mobile hotspot; and granting, in response to the connection request, the access to the additional device.

2. The method of claim 1, further comprising associating the detection with the activation of a mobile hotspot operation based on a prior manual activation of a mobile hotspot operation and a prior occurrence of the detection.

3. The method of claim 1, wherein the mobile hotspot operation is activated further in response to at least one of a time of the occurrence of the detection or a location of the occurrence of the detection.

4. The method of claim 1, wherein the access is granted in response to a determination that the additional device has previously accessed the mobile device as a mobile hotspot.

5. The method of claim 1, wherein the access is granted in response to a determination that the additional device has communicated with the same Wi-Fi access point as the mobile device before the occurrence of the detection.

6. A mobile device, comprising:
one or more processors configured to:
detect, at the mobile device, a Wi-Fi access point having a service set identification (SSID);
determine that the detection of the Wi-Fi access point is associated with activating a mobile hotspot operation on the mobile device based at least in part on the SSID of the Wi-Fi access point, wherein determining based at least in part on the SSID of the Wi-Fi access point comprises determining that the SSID of the Wi-Fi access point is associated with Wi-Fi connectivity between the mobile device and the Wi-Fi access point determined to be lost or intermittent for or inaccessible to the mobile device;
in response to the determining, activate a mobile hotspot operation on the mobile device;
receive, from an additional device different than the Wi-Fi access point, a connection request to access the mobile device as a mobile hotspot; and
grant, in response to the connection request, the access to the additional device.

7. The mobile device of claim 6, wherein the one or more processors are further configured to associate the detection with the activation of a mobile hotspot operation based on a prior manual activation of a mobile hotspot operation and a prior occurrence of the detection.

8. The mobile device of claim 6, wherein the mobile hotspot operation is activated further in response to at least one of a time of the occurrence of the detection or a location of the occurrence of the detection.

9. The mobile device of claim 6, wherein the access is granted in response to a determination that the additional device has previously accessed the mobile device as a mobile hotspot.

10. The mobile device of claim 6, wherein the access is granted in response to a determination that the additional device has communicated with the same Wi-Fi access point as the mobile device before the occurrence of the detection.

11. An apparatus comprising instructions embodied on a tangible, non-transitory computer-readable medium, the instructions operable when executed to cause a computing system to perform operations comprising:
detecting, at a mobile device, a Wi-Fi access point having a service set identification (SSID);
determining that the detection of the Wi-Fi access point is associated with activating a mobile hotspot operation on the mobile device based at least in part on the SSID of the Wi-Fi access point, wherein determining based at least in part on the SSID of the Wi-Fi access point comprises determining that the SSID of the Wi-Fi access point is associated with Wi-Fi connectivity between the mobile device and the Wi-Fi access point determined to be lost or intermittent for or inaccessible to the mobile device;
in response to the determining, activating a mobile hotspot operation on the mobile device;
receiving, from an additional device different than the Wi-Fi access point, a connection request to access the mobile device as a mobile hotspot; and
granting, in response to the connection request, the access to the additional device.

12. The apparatus of claim 11, wherein the operations further comprise associating the detection with the activation of a mobile hotspot operation based on a prior manual activation of a mobile hotspot operation and a prior occurrence of the detection.

13. The apparatus of claim 11, wherein the mobile hotspot operation is activated further in response to at least one of a time of the occurrence of the detection or a location of the occurrence of the detection.

14. The apparatus of claim 11, wherein the access is granted in response to a determination that the additional device has previously accessed the mobile device as a mobile hotspot.

15. The apparatus of claim 11, wherein the access is granted in response to a determination that the additional device has communicated with the same Wi-Fi access point as the mobile device before the occurrence of the detection.

* * * * *